US011643279B1

(12) United States Patent
Sekich et al.

(10) Patent No.: US 11,643,279 B1
(45) Date of Patent: May 9, 2023

(54) CONVEYOR SYSTEM FOR AUTONOMOUS ROBOT

(71) Applicant: A9.com, INC., Palo Alto, CA (US)

(72) Inventors: Danny Sekich, Loveland, CO (US); Karl McDowall, Boulder, CO (US); Joshua Bavari, Boulder, CO (US); Jonathan McQueen, Boulder, CO (US); Phillip Walkemeyer, Palo Alto, CA (US)

(73) Assignee: Amazon Technologies, Inc., Seattie, WA (US)

( * ) Notice: Subject to any disclaimer, the term of this patent is extended or adjusted under 35 U.S.C. 154(b) by 298 days.

(21) Appl. No.: 17/021,449

(22) Filed: Sep. 15, 2020

Related U.S. Application Data

(63) Continuation of application No. 16/032,647, filed on Jul. 11, 2018, now Pat. No. 10,793,369.

(60) Provisional application No. 62/531,468, filed on Jul. 12, 2017.

(51) Int. Cl.
*G06F 7/00* (2006.01)
*B65G 43/00* (2006.01)
*B65G 47/34* (2006.01)
*B65G 43/08* (2006.01)
*B65G 47/50* (2006.01)

(52) U.S. Cl.
CPC ............. *B65G 43/00* (2013.01); *B65G 43/08* (2013.01); *B65G 47/34* (2013.01); *B65G 47/503* (2013.01); *B65G 2203/041* (2013.01)

(58) Field of Classification Search
CPC ........ B65G 43/00; B65G 43/08; B65G 47/34; B65G 47/503; B65G 2203/041
USPC ................................. 700/213–214, 228–230
See application file for complete search history.

(56) References Cited

U.S. PATENT DOCUMENTS

| 2017/0121134 | A1* | 5/2017 | Girtman | B65G 67/24 |
| 2017/0320102 | A1* | 11/2017 | McVaugh | B07C 5/361 |
| 2018/0111769 | A1* | 4/2018 | Yuvaraj | B25J 5/00 |
| 2018/0297786 | A1* | 10/2018 | Clucas | B65G 37/00 |

\* cited by examiner

*Primary Examiner* — Yolanda R Cumbess
(74) *Attorney, Agent, or Firm* — Eversheds Sutherland (US) LLP

(57) ABSTRACT

An autonomous robot with a modular conveyor belt moves materials in a warehouse or other industrial environment. Example embodiments may include systems and methods for autonomous robots with conveyor systems. An example method may include detecting, by an autonomous cart, an unloading station, moving to a position at or near the unloading station, and determining, using a first load cell, a first position of a first item on a conveyor belt of the autonomous cart. Some methods may include determining a length of time for which to actuate the conveyor belt based at least in part on the first position, and causing the conveyor belt to unload the first item from the autonomous cart by actuating the conveyor belt for the length of time.

21 Claims, 14 Drawing Sheets

CONVEYOR SYSTEM FOR AUTONOMOUS ROBOT

CROSS-REFERENCE TO RELATED APPLICATION(S)

This application is a continuation of U.S. application Ser. No. 16/032,647, filed Jul. 11, 2018, which claims the benefit of U.S. Application No. 62/531,468, filed Jul. 12, 2017, both of which are hereby incorporated by reference in their entireties.

BACKGROUND

An autonomous robot, also called a robot, an autonomous cart, or simply a cart, can move products and materials in a warehouse or other industrial environment. The autonomous robot can navigate autonomously indoors or outdoors in dynamic environments where things change frequently. An autonomous robot can make factories and warehouses more efficient and safer. It enables the movement of smaller batches of material more frequently, reduces the need for expensive conveyor systems, and supplants eliminate dangerous fork trucks from indoor environments.

SUMMARY

Embodiments of the present technology include a method of loading or unloading a conveyor belt on an autonomous cart. The autonomous cart's visual navigation system detects a loading station. The autonomous cart moves to a position next to the load station, and the visual navigation system detects that the autonomous cart is positioned to be loaded or unloaded at the loading station. In response to detecting that it is positioned to be loaded or unloaded at the loading station, the autonomous cart actuates the conveyor belt for loading or unloading.

Moving to a position next to the loading station may include orienting the autonomous cart with respect to the loading station based on a direction of movement of the conveyor belt. It can also include moving an edge of the conveyor belt to within about 5 cm of another conveyor belt at the loading station. Detecting that the autonomous cart is positioned to be loaded or unloaded may include making a visual odometry measurement with the visual navigation system.

The autonomous cart may actuate the conveyor belt at a predetermined speed for a predetermined time, e.g., based on a desired destination of an item with respect to the conveyor belt at the end of the predetermined time. For instance, the predetermined speed can be about 0.5 meters/second to about 1.5 meters/second and the predetermined time can be from about 2 seconds to about 4 seconds for conveyor belt that is about 1.5 meters long. In some cases, the conveyor belt is a first conveyor belt, and the first conveyor belt may receive an item from a second conveyor belt at the loading station that is also operating at the predetermined speed.

The autonomous cart may include one or more load cells that can detect placement of a mass on the conveyor belt, displacement of a mass from the conveyor belt, and/or a partially loaded (or partially unloaded) item on the conveyor belt. If the load cell senses such an item, it can issue an alert to user about the partially loaded item.

In some cases, the visual navigation system detects a height of the loading station. In these cases, the autonomous cart triggers an actuator that adjusts the conveyor belt based on the height of the loading station. The visual navigation system can also detect an item at the loading station for loading onto the conveyor belt or if the loading station can receive an item from the conveyor belt.

The autonomous cart may also actuate at least one conveyor belt at the loading station to load or unload the conveyor belt on the autonomous cart. In these cases, the loading station conveyor belt's length may be equal to a length of the conveyor belt on the autonomous cart.

Other embodiments of the present technology include an autonomous robot with at least one camera, a processor operably coupled to the camera, a locomotive system operably coupled to the processor, and a conveyor belt operably coupled to the processor. In operation, the camera collects imagery of an area containing a loading station. The processor identifies the loading station in the imagery collected by the camera and plans a path to the loading station based at least in part on the imagery collected by the one camera. The locomotive system moves the autonomous robot along the path to the loading station. And the conveyor belt loads or unloads an item at the loading station.

The processor can identify an item for pickup at the loading station based on the imagery collected by the camera. It can also plan the path based at least in part on a direction of motion of the conveyor belt and on a desired orientation of the conveyor belt with respect to the loading station.

The conveyor belt can load or unload the item by operating at a predetermined speed for a predetermined time.

The autonomous robot may also include at least one load cell, operably coupled to the processor, measure force exerted by an item on the conveyor belt. In this case, the processor can determine a presence of the item on the conveyor based on the measurement made by the at least one load cell.

Yet another embodiment of the present technology includes a method of loading a first conveyor belt on an autonomous cart with an item on a second conveyor belt. The autonomous cart's visual navigation system detects the item on the second conveyor belt. The autonomous cart orients itself with respect to the second conveyor belt based on a direction of movement of the first conveyor belt. The autonomous cart positions the first conveyor belt within 5 cm of the second conveyor belt. It detects, by making an odometry measurement, that the first conveyor belt is within 5 cm of the second conveyor belt. And in response to detecting that the first conveyor belt is within 5 cm of the second conveyor belt, it actuates the first conveyor belt and the second conveyor belt at a speed of about 1.5 m/s to receive the item on the second conveyor belt.

Yet another embodiment of the present technology includes a method of moving an item from a first conveyor belt on an autonomous cart to a second conveyor belt. A load cell in or on the autonomous cart senses the item on the first conveyor belt. The autonomous cart's visual navigation system locates the second conveyor belt. The autonomous cart orients itself with respect to the second conveyor belt based on a direction of movement of the first conveyor belt. It positions the first conveyor belt within 5 cm of the second conveyor belt and detects, by an odometry measurement, that the first conveyor belt is within 5 cm of the second conveyor belt. In response to detecting that the first conveyor belt is within 5 cm of the second conveyor belt, the autonomous cart actuates the first conveyor belt at a speed of about 1 m/s for about 2 seconds to move the item from the first conveyor belt to the second conveyor belt.

All combinations of the foregoing concepts and additional concepts discussed in greater detail below (provided such concepts are not mutually inconsistent) are part of the inventive subject matter disclosed herein. All combinations of claimed subject matter appearing at the end of this disclosure are part of the inventive subject matter disclosed herein. The terminology used herein that also may appear in any disclosure incorporated by reference should be accorded a meaning most consistent with the concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Embodiments disclosed herein relate to an autonomous robot, also called a cart, autonomous robot, or robot, to move products and materials in and around an industrial environment. The autonomous robot can navigate autonomously indoors or outdoors in environments where things change frequently. The autonomous robot uses state-of-the-art dense visual perception, giving it unequalled and continuous awareness of its surroundings. With this it can operate at a cost, speed, level of safety and efficiency that has never been possible before. These robots can make factories and warehouses more efficient and safer. They enable the movement of smaller batches of material more frequently, reduce the need for expensive and inflexible material handling systems, and help eliminate dangerous fork trucks from indoor environments.

An example autonomous robot has a modular design that enables different tools to be added easily to the robot. For example, multiple shelves or a fully-enclosed and lockable box can quickly be added to or removed from a robot. One of these tools is an automated conveyor belt that can be mounted to the robot and used to load or unload the robot automatically. The conveyor belt can be loaded by another conveyor belt, a person, another robot, a gravity-feed system, or any other suitable means. In some instances, the automated conveyor is actuated in response to the autonomous robot docking in position relative to a target, such as an image on or near another conveyor belt or the other conveyor belt itself. The robot's visual perception system determines that the robot is docked properly.

The autonomous robot uses its built-in load cells to determine the number, sizes, weights, and even spatial distribution of the items that it is carrying. It uses this information and knowledge of the conveyor belt's direction of motion to orient itself and the conveyor belt with respect to a loading station and to actuate the conveyor belt for unloading. For instance, the conveyor belt may unload one item per loading station or unload the items one at a time. If a processor on or coupled to the robot identifies a problem with loading or unloading items, e.g., based on the load cell readings, the robot can warn a user of the system that an item could fall off the conveyor onto the floor, e.g., via a light pattern on the robot, message on a website that is associated with the system, text message, email, or other user alert.

An Autonomous Cart and its Components

Figure 1A:
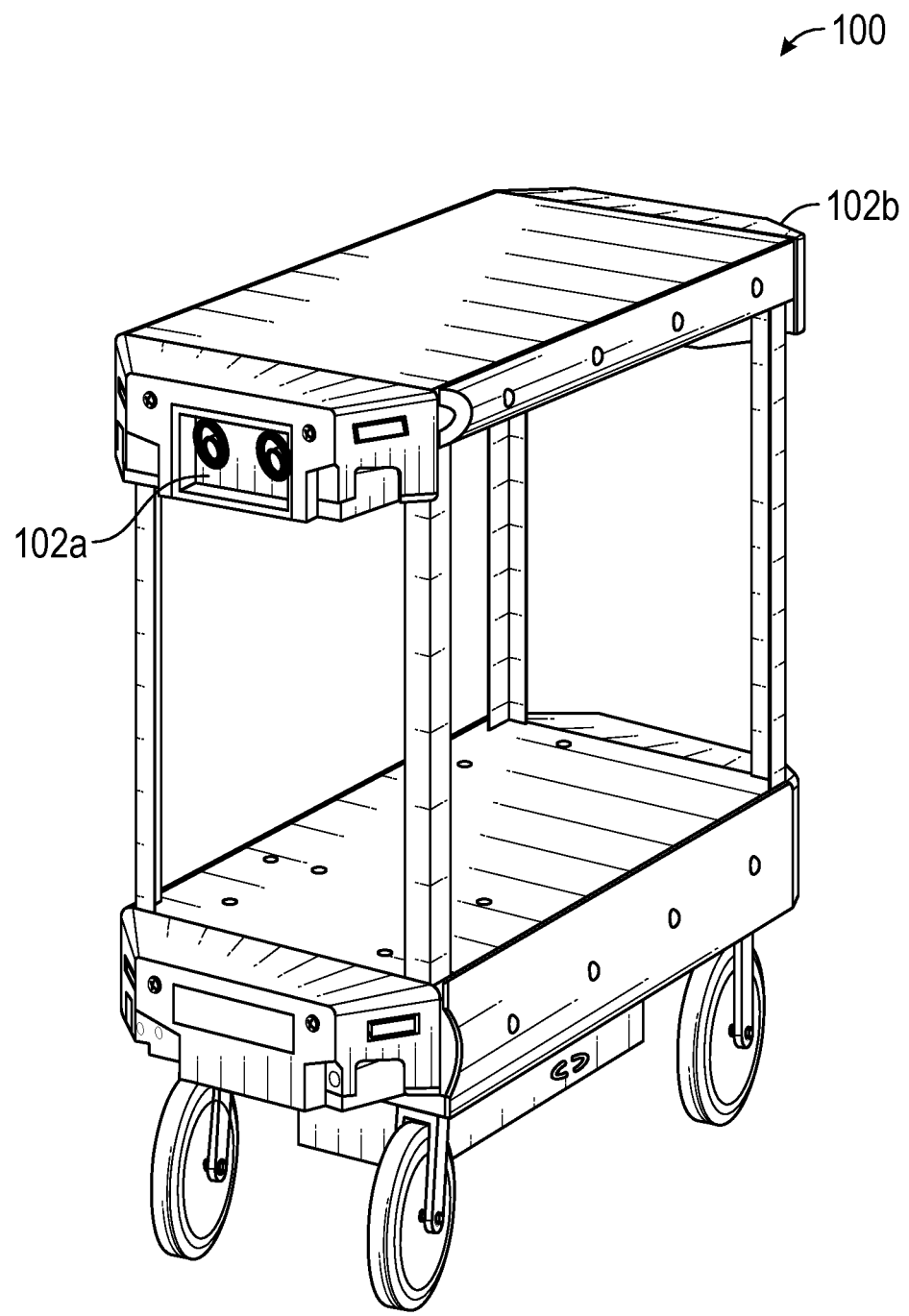
FIG. 1A shows an example autonomous cart.
Figure 1B:
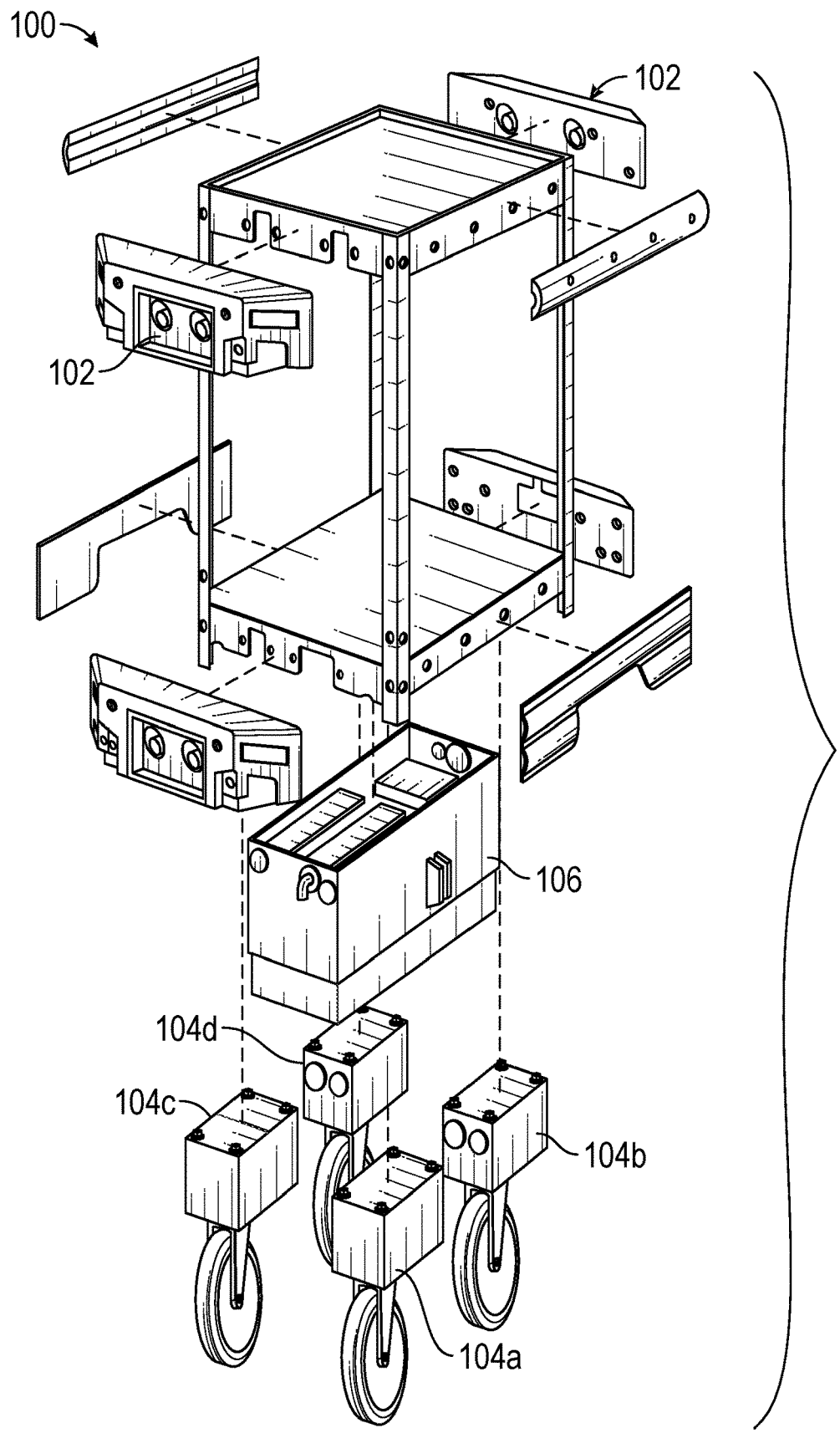
FIG. 1B is an exploded view of the autonomous cart of FIG. 1A.

FIGS. 1A and 1B show perspective and exploded views, respectively, of an example autonomous cart 100 suitable for use in warehouses, manufacturing facilities, and outdoor settings. The autonomous cart 100 includes forward-looking 102a and backward-looking 102b binocular vision sensor units (collectively, binocular vision sensor units 102), each of which includes two laterally displaced image sensors (cameras) and accompanying hardware; a locomotive system, which includes four drive train units (for example, 104a, 104b, 104c, and 104d, collectively, drive train units 104), each of which is mounted under a different corner of the chassis; and an underbelly 106 containing additional electronics. The autonomous cart 100 can also include a two-dimensional LIDAR (not shown) to look sideways and identify objects or people approaching the cart from the side that the binocular vision sensor units may not sense or identify. For instance, the LIDAR can be used to position the autonomous cart 100 within about 1 cm from a loading station as discussed below. The autonomous cart 100 may also include other sensors and electronics, including side-looking image or acoustic sensors as well as an antenna 140 (FIG. 8B) for communicating with a wireless communication network using a suitable wireless communication protocol (e.g., IEEE 802.11 protocols).

Figure 1C:
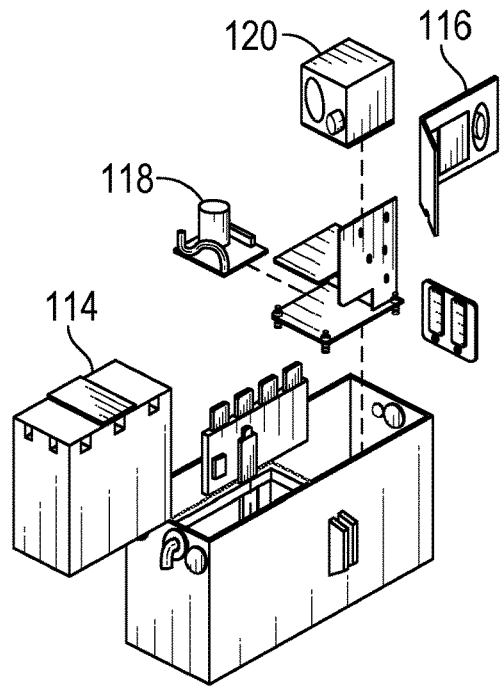
FIG. 1C is an exploded view of an underbelly unit for the autonomous cart of FIG. 1A.

FIG. 1C shows an exploded view of the underbelly 106, which includes several processors and a battery 114 for powering the electronics on the autonomous cart. The processors include a graphics processor unit (GPU) 116 and central processor unit (CPU) 118 for processing information from the cart's sensors, from other carts, and from servers or other devices, including conveyor belts at loading stations, that communicate with the cart via the antenna. The underbelly also contains a position sensor unit (PSU) 120, such as an Inertial Measurement Unit (IMU), that measures the cart's acceleration (including the constant acceleration of gravity, which indicates whether the cart is going up or down) and the cart's rate of change of orientation.

Figure 1D:
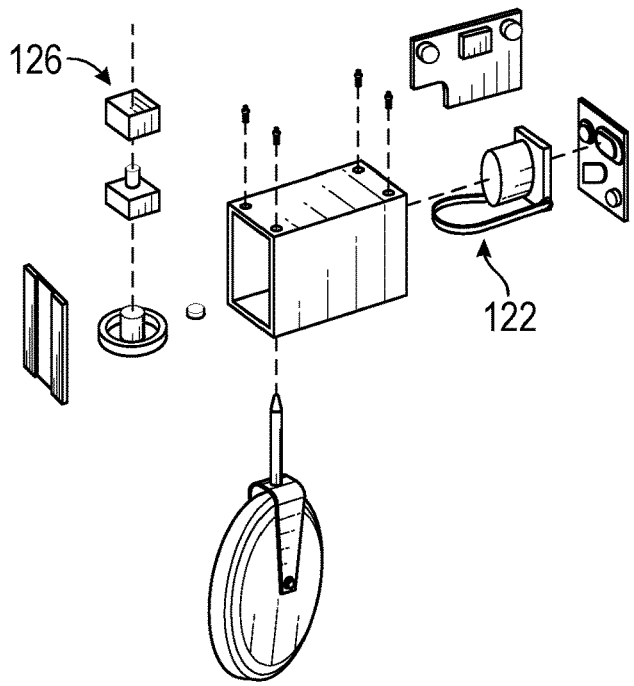
FIG. 1D is an exploded view of a drive train unit for the autonomous cart of FIG. 1A.

FIG. 1D shows an exploded view of one of the drive train units 104 that provide the locomotive force for the cart's locomotive system. The drive train unit 104 includes a steer motor 122 that turns a wheel mounted on a vertical axis. It also includes an encoder block that can measure the number of rotations of an axis coupled to the steer motor 122 in order to provide an indication of how far the cart has moved and how fast it is moving or has moved. In other words, the encoder block makes a wheel odometry measurement that can be used to determine distance and speed.

A load cell assembly 126 mounted in or on the drive train unit 104 measures force exerted on the cart as explained in greater detail below. The load cell assembly 126 can be located next to the encoder within a single block of aluminum on the opposite side of the steering motor, on the output shaft, or in any other suitable position.

The drive train unit 104 may include a brake (not shown) to slow the cart or keep it from moving. The drive train unit 104 may also turn the wheel slightly inward, much like snowplowing when skiing, to slow or stop the cart or to keep it stopped. Turning the wheels slightly inward is relatively easy to control and very effective, even on an incline. Each wheel includes a drive train unit and a steering motor and can drive and turn independently, enabling holonomic motion of the autonomous cart.

Figure 2:
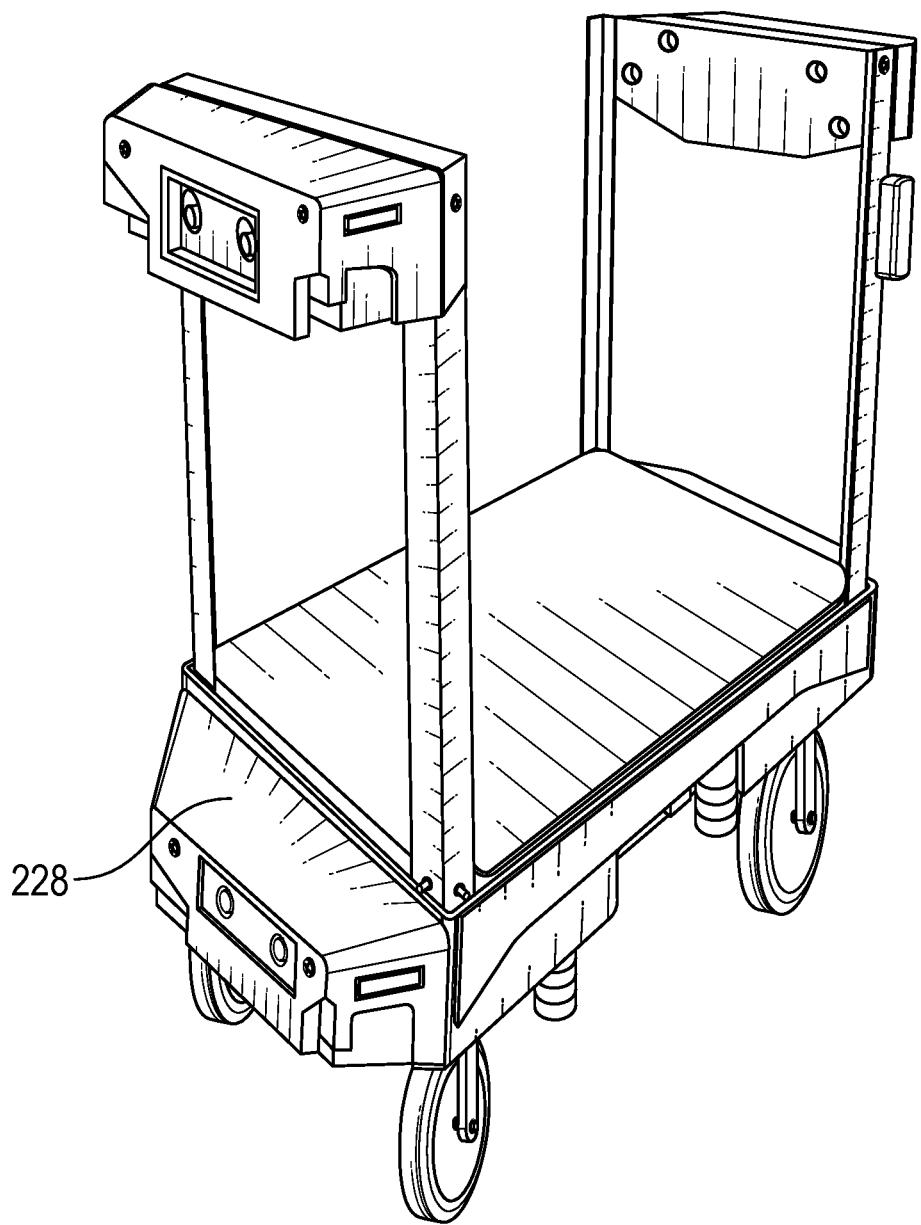
FIG. 2 is a photograph of an autonomous cart without a second shelf.

FIG. 2 shows the chassis 228 of an autonomous cart 100. The chassis 228 may be constructed from aluminum sheet, aluminum tubing, machined aluminum, and plastic parts and is designed to be flexible in overall dimensions depending on customer requirements and desires. It typically has a minimum length of 36 inches and a minimum width of 24 inches. The chassis 228 has modular components so that it can be expanded in either direction. The cameras (binocular vision sensor units 102) are usually mounted at heights of approximately 30-36 inches to get useful views of surroundings, but the shelves can be lower or higher within reason. FIG. 2 shows the basic configuration, which includes a lower shelf above the wheels, batteries, and drives. Move shelves can be added at any height (and can be moved up or down by a user in minutes) as shown in FIGS. 1A and 1C. The entire chassis 228 floats on the four load cell assemblies 126, one for each wheel/corner of the cart as describe below. This enables the features outlined below which are based on measuring load on each of the four load cell assemblies 126.

Locomotive System

Figure 3:
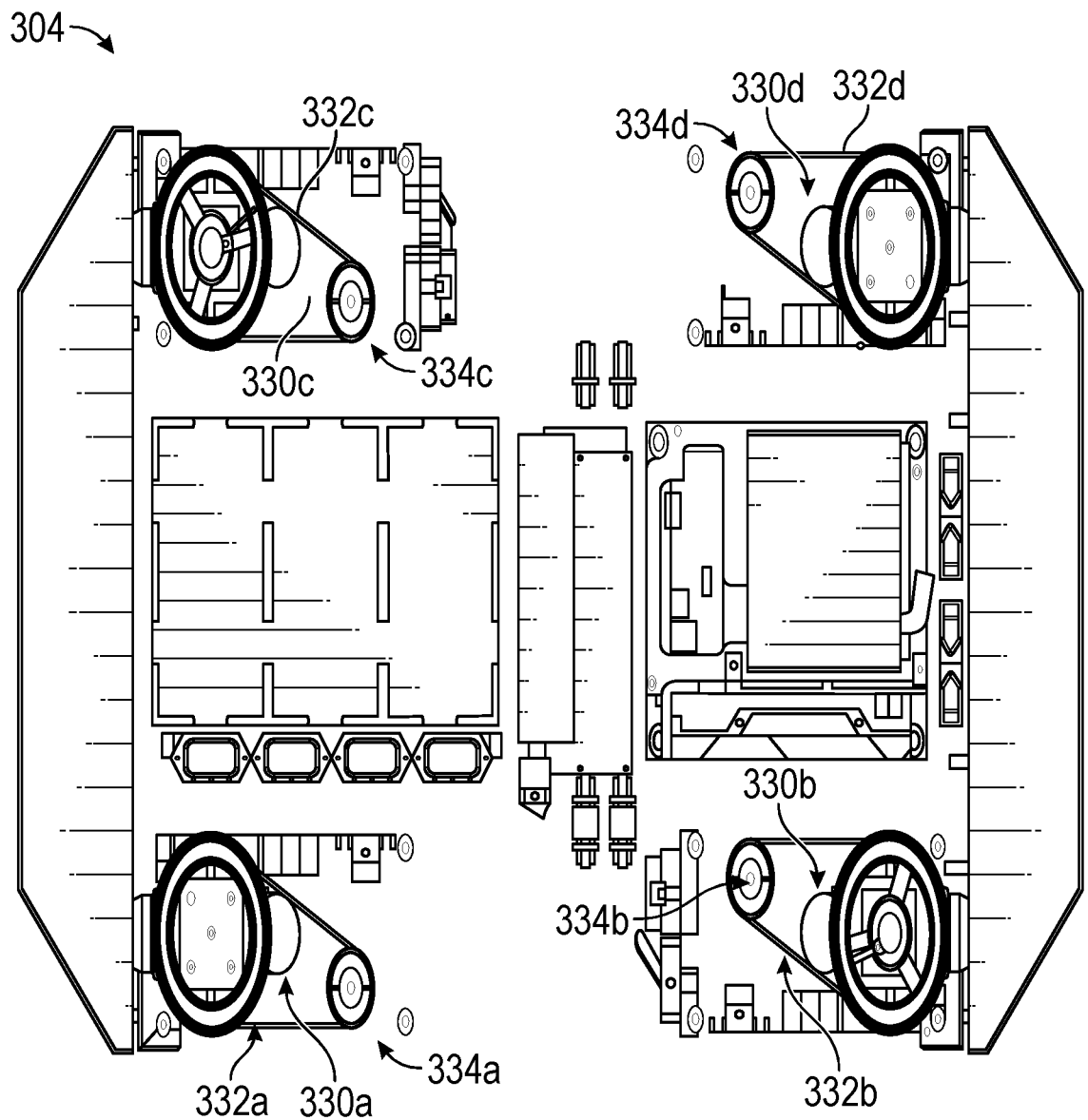
FIG. 3 is a cutaway view of the base of an autonomous cart showing the wheel assemblies with steering pulleys and motors.

FIG. 3 shows the cart's locomotive system or drive system 304, which includes four wheel assemblies with wheels 330a-330d (collectively, wheels 330), steering pulleys 332a-332d (collectively, steering pulleys 332), and motors 334a-334d (collectively, motors 334). The drive system 304, which has a vertical steering axis, is a swerve drive. The drive system 304 can be more difficult to control than a drive system with an angled steering axis or a skid-steer arrangement but provides more maneuverability. The swerve drive uses wheel motors to drive and steering motors to turn.

Figure 4:
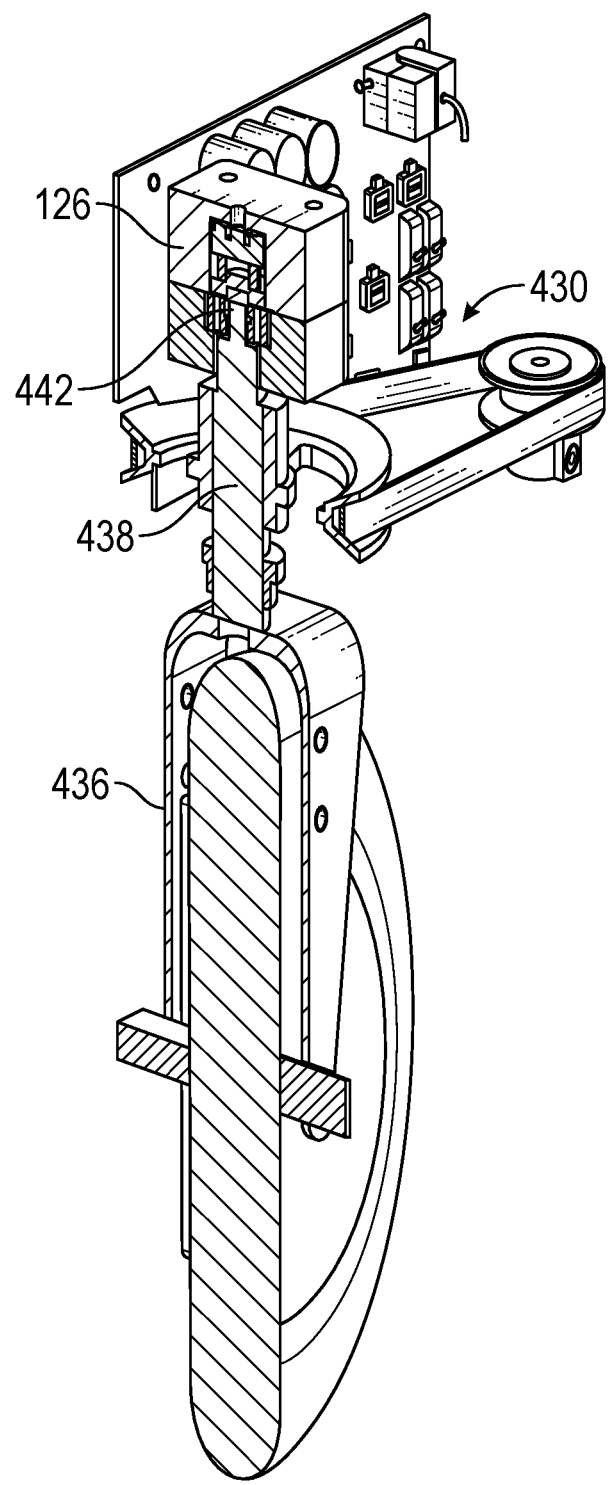
FIG. 4 is a perspective cutaway view of an autonomous cart wheel assembly, including a load cell block, encoder, steering shaft, yoke, and steering belt.

FIG. 4 shows a wheel assembly 430. Each wheel is held in place by a yoke 436, which is attached directly to the vertical steering shaft 438. The steering shaft 438 is held in place by upper and lower bearings, which allow the shaft 438 to rotate and move vertically. The vertical movement allows the steering shaft 438 to push against a load cell assembly 126 at the top. The shaft 438 also turns an encoder 442 that provides rotational measurements to enable steering control and wheel odometry measurements.

The cart's locomotive system enables holonomic motion: Steering can be front-only (like a car), rear-only, all-wheel, or crab. All-wheel steering enables the robot to spin in place. Crab steering enables it to move sideways. The flexibility of the cart's steering enables better trajectory planning, allowing smooth motion even when compensating for any potential short-term flaws in perception or localization. It also enables the cart to move sideways, moving into positions where a front-only or skid-steer device would have to do a more complicated 3-point turn or parallel parking maneuver.

Load Cells

Figure 5:
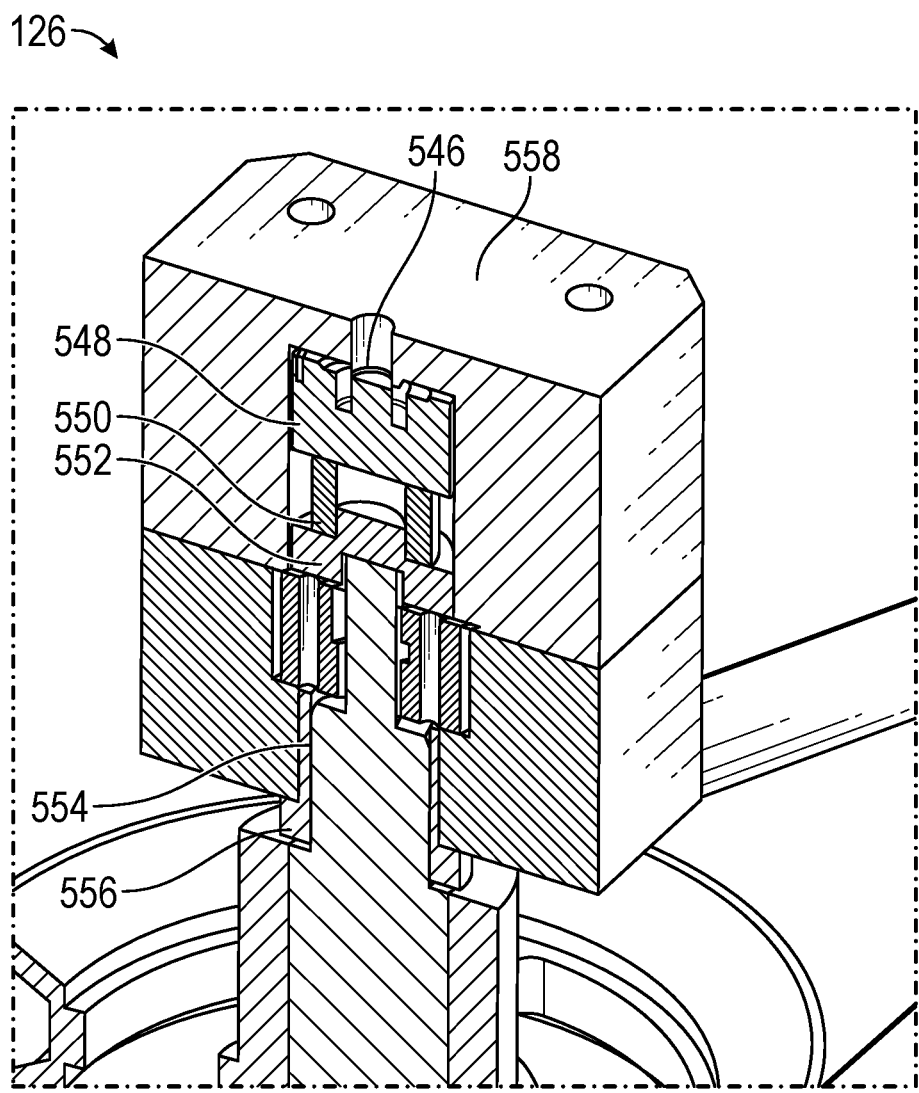
FIG. 5 is a perspective cutaway view of the load cell block of FIG. 4, including a pre-load adjustment screw, load cell, spring, force distribution plate, bearing, gap, and housing.

FIG. 5 shows the load cell assembly 126 for the autonomous cart 100 in greater detail. The cart 100 has one load cell assembly 126 above each wheel to measure forces exerted on the cart 100. The load cells assemblies 126 report the force measurements to the CPU 118, which subtracts the weight of the cart body from the accumulated total weight sensed by the load cell assemblies 126 to obtain the weight of the cart's payload. The CPU 118 and/or other onboard processors use the weight (and changes in the weight) of the cart's payload to tally masses put on and taken off the cart 100, count the items on the cart 100, estimate the location of the cart's center of mass, measure loading and unloading time, and count mass loaded or unloaded at a loading station. The CPU 118 may report these measurements, estimations, and predictions to a server for triggering actions by the cart 100, people, or other devices, such as sending the cart 100 to another location, triggering movement or production of another item, etc.

The load cell assembly 126 includes a pre-load adjustment screw 546, load cell 548, spring 550, force distribution plate 552, bearing 554 that enables vertical and rotational motion, and a gap 556 that enables shaft to move vertically. The gap 556 closes before the load cell 548 is overloaded. The housing 558 is attached directly to the autonomous cart's chassis 228.

The load cells 548 may be any off-the-shelf load cell, such as a piezoelectric type, with a range suitable for the size and mass of the robot and the expected load. In some instances, the load cells use a range of 0-200 lbf. The load cells 548 can be situated at the bottom or top of the shaft such that they are exposed to the vertical force acting on the wheels from above. The shaft can be held by bearings in such a way that the shaft is free to move linearly in a vertical direction, and rotate during steering, but not move laterally.

Vision System

The cart 100 uses its vision system, which includes the binocular vision sensor units 102, GPU 116, and CPU 118, to identify and navigate to destinations throughout its environment. Cameras in the binocular vision sensor units 102 acquire imagery of the cart's surroundings. The GPU 116 and/or CPU 118 implement a classifier, such as an Artificial Neural Network, Support Vector Machine (SVM), or Expectation Maximization (EM) based machine learning system, that identifies objects in the images. These objects may be targets, such as logos or patterns, that indicate destinations like loading stations or charging stations. The classifier may also recognize the destinations themselves, obstacles, people, and other carts, depending on how it has been trained.

The cart's onboard processors, including the CPU 118, plan a path or trajectory to a destination based on the images collected and processed by the cart's vision system. For example, the cart's onboard processors can plan a path that places the cart close enough to a loading station to load or unload items from a conveyor belt mounted on the cart. As part of this path planning, the cart may use an onboard map of its environment or communicate with a server that coordinates cart movements, loading, and unloading. The processor(s) may identify obstacles between it and the loading station and plan the path to avoid the obstacles. And as part of the path planning, the processor(s) may also determine how to orient or angle the cart with respect to the loading station.

For more information on autonomous carts, including more information on load cells and path planning, see International Application No. PCT/US2017/048201, which is entitled "Autonomous Cart for Manufacturing and Warehouse Applications" and is incorporated herein by reference in its entirety.

An Onboard Conveyor for an Autonomous Cart

Figure 6:
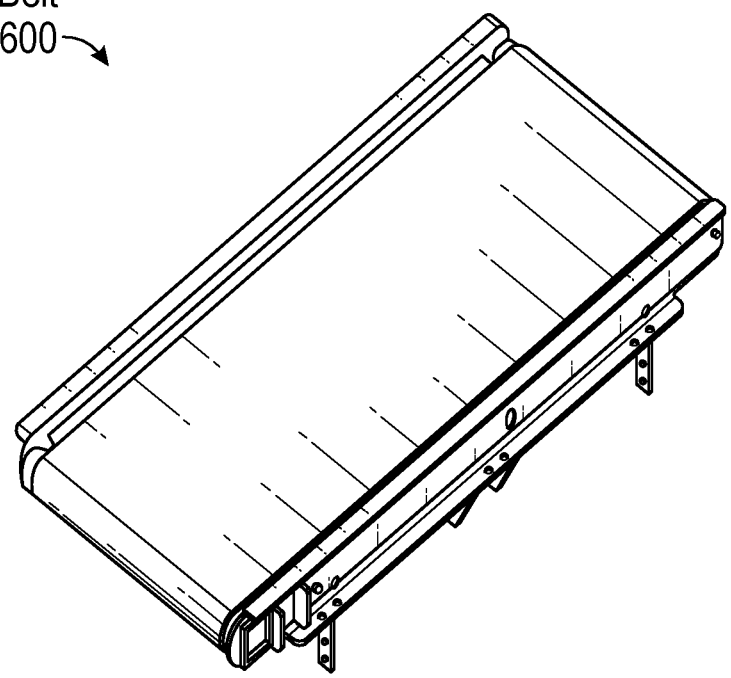
FIG. 6 is a perspective view of a modular conveyor accessory, also called a conveyor belt, that can be mounted on top of an autonomous cart.
Figure 7:
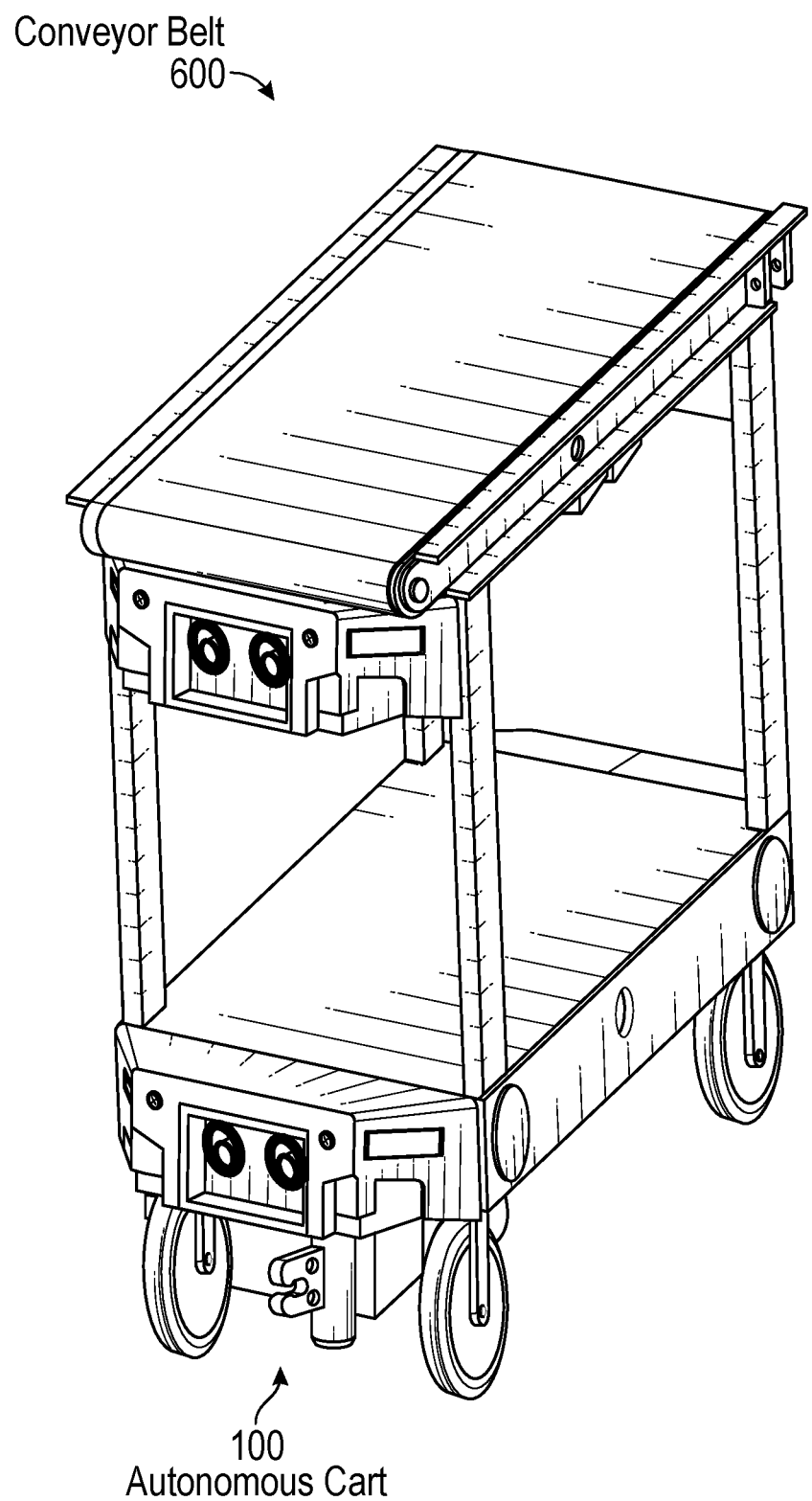
FIG. 7 is a perspective view of a conveyor belt mounted to an autonomous cart.

FIG. 6 shows an onboard conveyor belt 600 for an autonomous mobile robot, such as the autonomous cart shown in FIGS. 1A and 1B. The conveyor belt 600 is a modular unit that can be mounted to the autonomous mobile robot as shown in FIG. 7 for loading or unloading goods and materials. The connection between the conveyor belt 600 and the cart 100 can be a simple mechanical connection, with a conveyor mounted on legs that connect to the cart 100 or a shelf or tubing connected to the cart 100. The conveyor belt 600 is plugged into an electrical board on the cart 100 via one or more electrical cables for electrical power and control signals.

The conveyor belt or rollers are actuated by a brushless DC motor 610 (FIG. 8B) controlled by the autonomous cart's processors. The motor 610 runs at a specified speed for a specified time to ensure complete loading or unloading. If the conveyor belt 600 is 1.5 meters long, the motor 610 may move the conveyor belt at a speed of about 1 meter/second for about 2 seconds. At this speed and time, any item that is completely on the conveyor belt 600 should be moved completely off the conveyor belt 600 before the motor 610 switches off. Longer conveyor belts may run faster, longer, or both; shorter conveyor belts may run slower, shorter, or both.

This time-based approach to unloading the conveyor belt 610 requires no additional sensors and adds simplicity and reliability to the system. Unloading can be triggered by the cart's visual system or by a proximity sensor, such as a Reed switch or Hall effect sensor, that measures the cart's proximity to the loading station. Unloading stops automatically, as soon as the time has elapsed. The motor 610 can be simpler because it runs at a single speed (e.g., 1 m/s) instead of a variable speed. There is no need to compute the unloading speed or unloading time.

The conveyor belt 600 may include or be on an actuator 620 (FIG. 8B) that can be used to adjust the conveyor belt's height or to tilt the conveyor belt 600. This actuator 630 responds to commands from the cart's onboard processors to raise, lower, or tilt the conveyor belt 600. The cart's onboard processors may issue these commands in response to determining, from images acquired by the cart's vision system, that the edge of the conveyor belt 600 is higher or lower than the edge of the loading station. This ensures that the conveyor belt 600 will be able to load or unload properly when the cart 100 is positioned next to the loading station.

The conveyor belt 600 may also include or be coupled to a light fence 630 (FIG. 8B) that can be used to start or stop the conveyor belt 600. The light fence 630 includes one or more light sources, such as light-emitting diodes (LEDs), and one or more photodetectors. In operation, the light sources shine beams of light on the photodetectors across the conveyor belt 600 in a plane that is perpendicular to the conveyor belt's direction of motion and at one end of the conveyor belt 600. An object traveling along the conveyor belt 600 breaks one or more the beams, producing changes in the signal(s) emitted by the photodetector(s). Typically, the signals change twice as the object moves across the conveyor belt 600: they decrease (sharply) as the object's leading edge crosses the light fence 630, interrupting the beams, then increase (sharply) as the object's trailing edge crosses the light fence 630, restoring the beams. These signal changes can be used to start or stop the conveyor belt 600, e.g., when loading an object or to prevent an object from falling off the conveyor belt. And multiplying the time between the increase and decrease by the conveyor belt speed yields the object's length, which can be useful for determining how many more objects can fit on the conveyor belt 600, etc.

If desired, the conveyor belt 610 can be paired with a stationary conveyor belt, such as an auto-load conveyor table, whose speed is matched to the conveyor belt's speed. This allows a safe handoff from robot to table and vice versa as explained in greater detail below.

An Auto-Load Conveyor Table

Figure 8A:
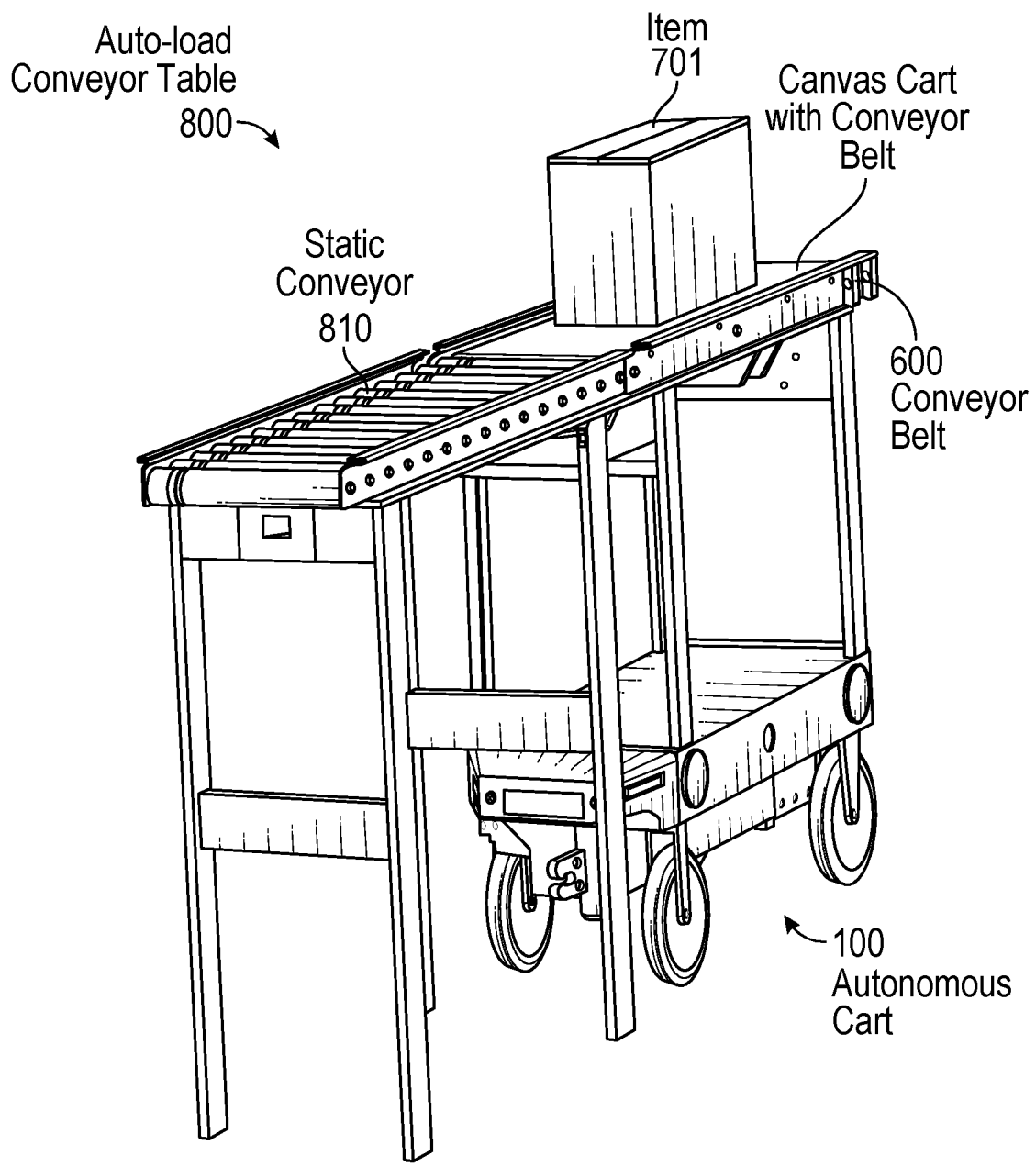
FIG. 8A is a perspective view of moving an item between a conveyor belt mounted to an autonomous cart and a stationary conveyor belt at a loading station.

FIG. 8A shows a conveyor belt 600 on an autonomous cart 100 docked with an auto-load conveyor table 800. The auto-load conveyor table 800 is a fixed position or stationary loading station that allows autonomous loading and unloading of goods and materials. It has a stationary conveyor belt 810 that can load items onto and receive items from the cart's conveyor belt 600. The auto-load conveyor table 800 may have its own motor for moving items on and off the stationary conveyor belt 810 and its own communications module for communicating with nearby mobile delivery robots, including the autonomous cart 100.

Figure 8B:
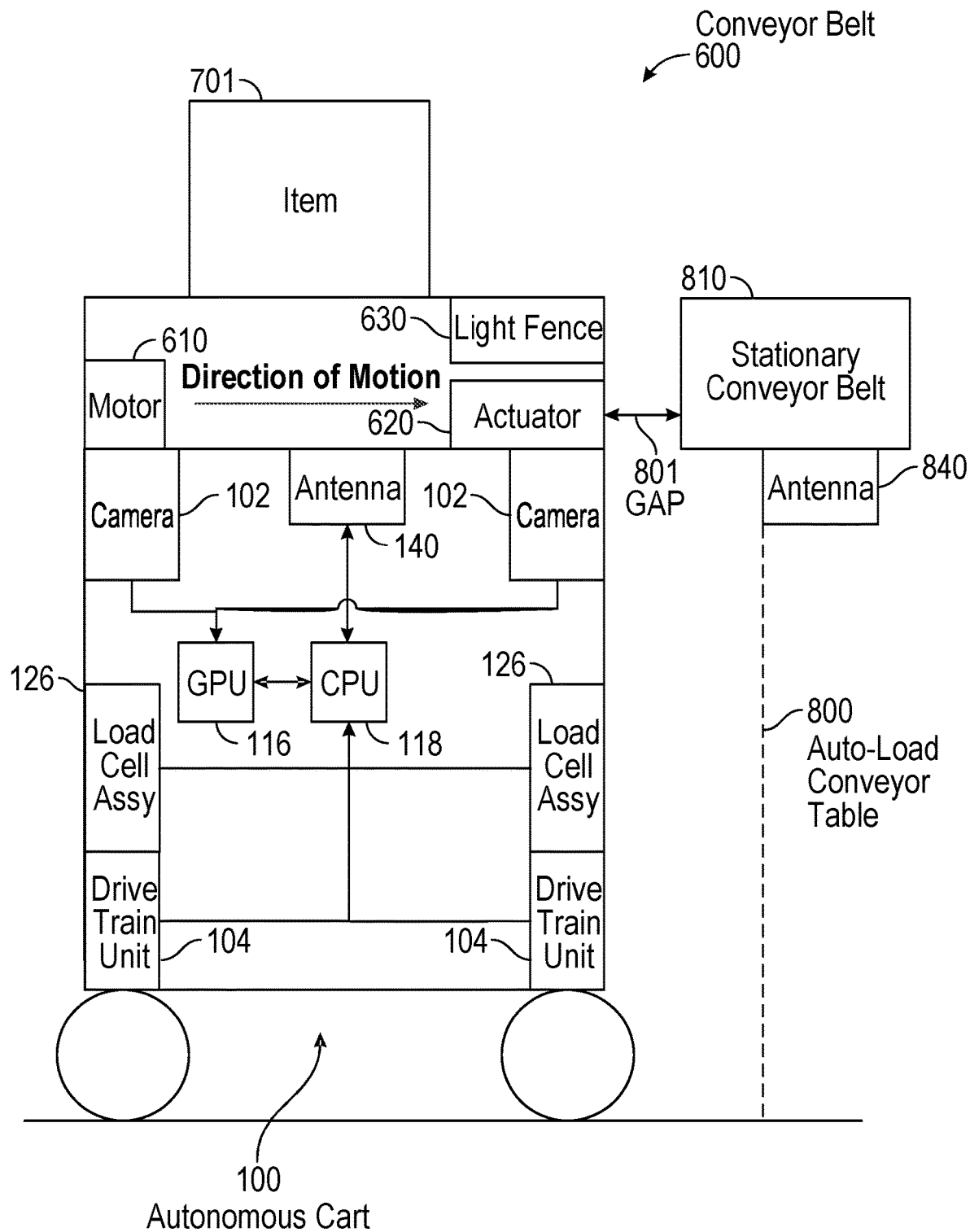
FIG. 8B is a block diagram of moving an item between a conveyor belt mounted to an autonomous cart and a stationary conveyor belt at a loading station.

FIG. 8B shows the autonomous cart 100, conveyor belt 600, and auto-load conveyor table 800 in greater detail. As explained above, the autonomous cart 100 has a vision system with binocular vision sensor units 102, a locomotive system with drive train units 104, load cell assemblies 126, processors (GPU 116 and CPU 118), and antenna 140. The conveyor belt 600 is mounted on the autonomous cart 100 and includes the motor 610, height/tilt actuator 620, and light fence 630. And the auto-load conveyor table 800 has a communication module (antenna) 840 as well as the stationary conveyor belt 810.

The robot 100 uses its vision system to dock the conveyor belt 600 to the stationary auto-load conveyor table 800 or other loading station. The robot's binocular vision sensor units 102 image a unique target, such as a logo on or near the loading station or the loading station itself. Based on these images, the robot navigates to the loading station and positions itself for delivery or receiving.

The robot's processors (GPU 116 and CPU 118) run a software stack with a sub-module (also referred to as target tracker sub-module) that enables the robot's autonomous navigation. This sub-module can track target images, including those of different loading and unloading sites, based on image-sensor outputs from the binocular vision sensor units 102. The target tracker sub-module may be a library of code that can be implemented in multiple applications and/or scenarios that benefit from target tracking.

The target tracker sub-module can be trained to identify a loading station, for example, the stationary auto-load conveyor table 800, based on the size and shape of the loading station itself or an image or other identifying feature (called a target) attached to or near the loading station. For example, the target can be a logo, drawing, or other pattern indicating the loading station. The target can be affixed to any place where the conveyor belt 600 should either load or unload. It could be affixed at a specified distance above the floor and a specified distance horizontally from the edge of the final position of the conveyor belt 600.

For loading or unloading, the mobile robot 100 automatically identifies the target on the stationary auto-load conveyor table 100. The mobile robot 100 moves until it is in the desired orientation and distance from the target. This is the correct position of the conveyor belt 600 relative to the table 800 to load or unload the contents of the conveyor belt 600.

The table 800 may use its communication module 840 to communicate with a nearby mobile delivery robot to facilitate transportation of materials from the table 800 to the robot or from the robot to the table 800. Once docked, for instance, the robot 100 can send a message via its antenna 140 and the table's antenna 840 to the table 800 to turn on the table's conveyor belt 810 at a predetermined speed for a predetermined amount of time (e.g., 1 meter/second for 2 seconds) for loading or unloading. In some instances, the table 800 communicates with the robot 100 via a server, e.g., using a Wi-Fi connection. In other instances, the table 800 and the robot 100 communicate directly, e.g., using a Bluetooth link.

In some instances, the stationary conveyor belt 810 on the auto-load conveyor table 800 has the same dimensions as the conveyor belt 600 on the autonomous cart 100 (e.g., a length of about 1.5 meters). This similar dimensional sizing allows for simple package transfer between the auto-load conveyor table 800 and the autonomous cart 100: the conveyor belts 600 and 810 just run at the same speed in the same direction for a predetermined time. If the goods have been positioned properly on the conveyor belts, and the conveyor belts move at the same speed for the same time, the goods are offloaded or onloaded successfully. With this paired geometry between the conveyor belts on the cart 100 and the table 800, no major sensors or devices are needed to ensure that the packages on the auto-load conveyor table 800 are transferred to the mobile cart 100 successfully. The geometry match between the auto-load conveyor table 800 and the cart 100 ensures that the number of packages delivered to the cart 100 is consistent and within the cart's working limits.

Serial Auto-Load Conveyor Tables

Figure 8C:
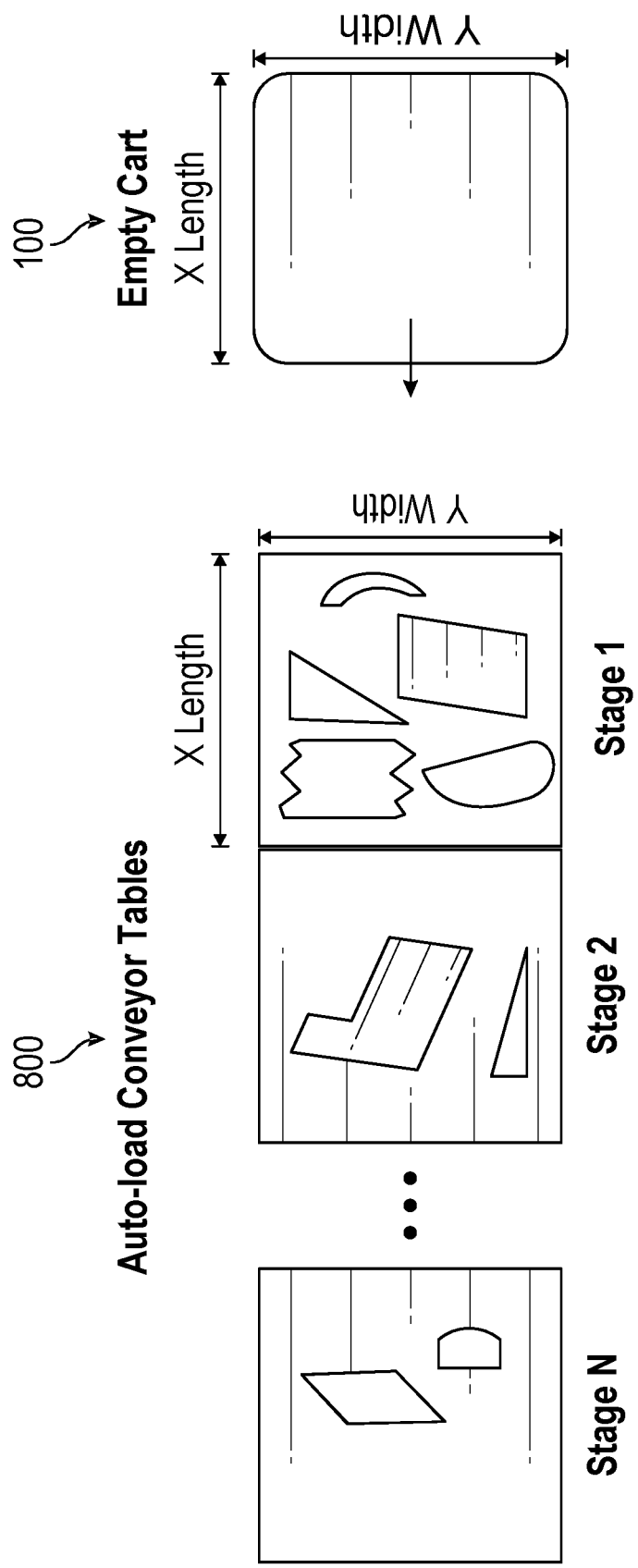
FIG. 8C is a plan view of a queue setup of several stationary conveyor belts used to load and unload an autonomous cart with a conveyor belt.

The auto-load conveyor table 800 can be scaled to handle a larger package queue by placing auto-load conveyor tables 800 in series with one another as shown in FIG. 8C. The tables 800 form stages in a multi-stage conveyor system. For simplicity, each table 800 may be the same length as the conveyor belt 600 on the cart 100 (e.g., 1.5 meters). This makes it easier for the person loading the tables 800 to know that the items placed on a given table stage can fit onto the robot 100. With this approach, many goods can be queued on the stages for later delivery to one or more empty carts 100. The auto-load tables 800 can be placed end-to-end such that the contents shift by one table length (or one cart length) each time the autonomous cart 100 is loaded. Each loading event moves the contents one stage towards the autonomous cart 100.

Loading can also be accomplished with one or more long auto-load tables, with cart lengths marked for loading on the auto-load table(s). Marking the distances for loading reduces the chances of a person or robot placing an item in between segments such that the item remains halfway on the cart when the conveyor belt stops turning. This is bad because an item halfway on the cart could fall to the floor when the cart moves away from the table. The auto-load conveyor can also be placed in parallel for loading and unloading. In such cases, the autonomous cart moves next to the target table, and the target auto-table is identified uniquely based on either position or target image.

Loading and Unloading a Conveyor Belt on an Autonomous Cart

Figure 9A:
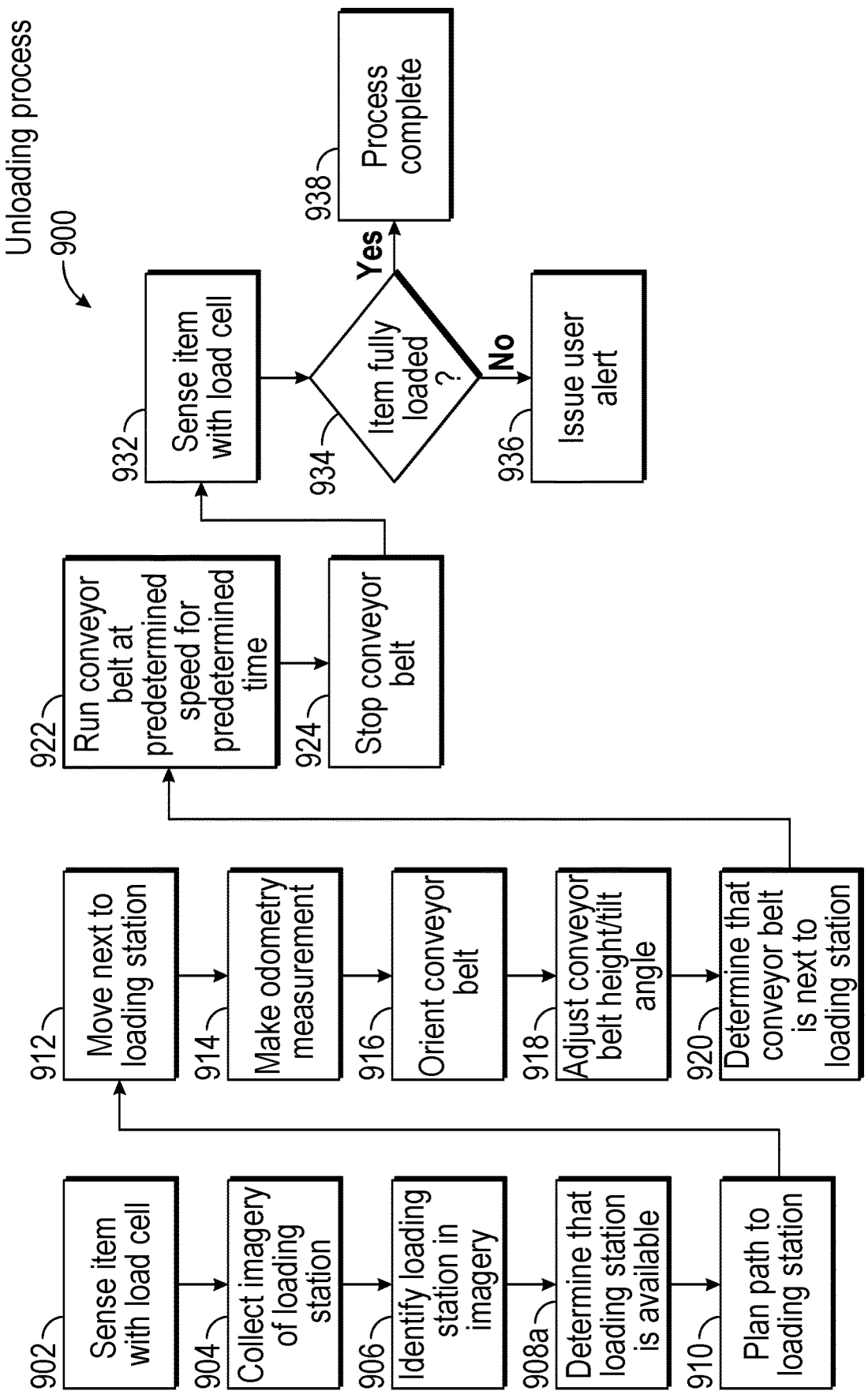
FIG. 9A is a flow diagram illustrating an unloading process for a conveyor belt mounted on an autonomous cart.
Figure 9B:
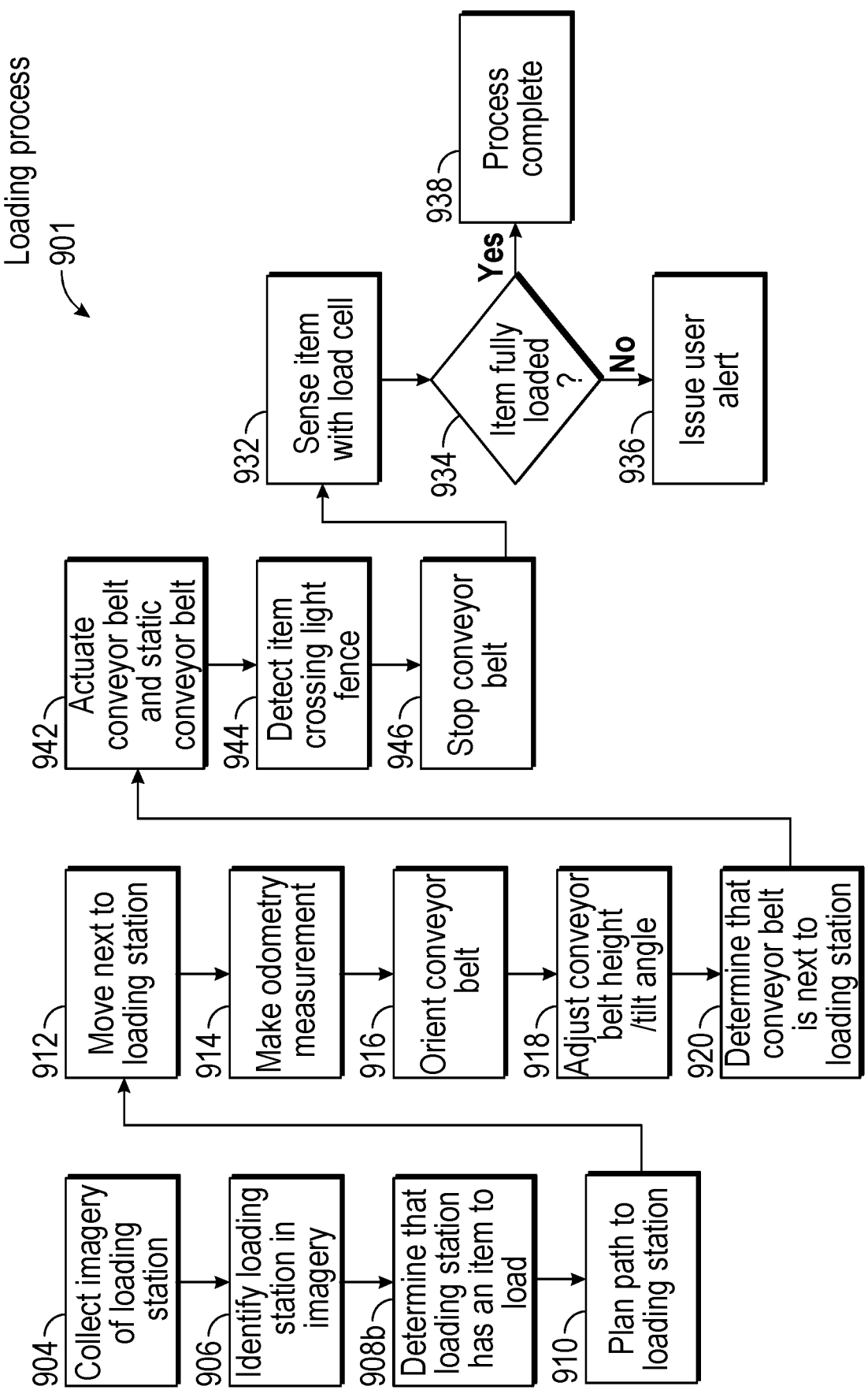
FIG. 9B is a flow diagram illustrating a loading process for a conveyor belt mounted on an autonomous cart.

FIGS. 9A and 9B illustrate an unloading process 900 and a loading process 901, respectively, for a conveyor belt 600 on an autonomous cart 100. In the unloading process 900, the cart's load cells detect a mass on the cart (step 902). The cart's processors interpret the presence of this mass as the presence of an object to be unloaded from the cart. (The cart's processors may also use other information, such as previous loading events or messages from a server, to infer the presence of the object.) In response to detecting the object, the cart may begin planning a path toward a loading station elsewhere in the warehouse using its internal map and/or information from a server.

As the autonomous cart 100 gets closer to its destination, it uses its cameras 102 to collect imagery of its surroundings (step 904). The cart's internal processors implement a classifier or other target tracking sub-module to identify the loading station in the imagery (step 906). For instance, the target tracking sub-module may look for a target on the front of loading station, such that the robot approaches head-on. The target tracking sub-module can even recognize the loading station if it has been trained appropriately. The target tracking sub-module may also determine if the loading station is available (step 908*a*), e.g., by looking for an empty space at the end of a stationary conveyor belt or other surface of the loading station.

In response to detecting the loading station, the cart plans a path to the loading system (step 910). Then it moves next to the loading station (step 912). As the mobile robot 100 approaches the target, it 'locks onto' and tracks the target as it moves closer to the target. To 'lock onto' the target, the robot 100 searches image outputs from one or more of its image sensors 102. The robot 100 generates an estimate of the target's relative position based on dense visual perception. The robot 100 repeats this process as it moves toward the target, tracking the target as it moves until it eventually arrives at its goal location relative to the target image. As the robot 100 gets closer (e.g., within about 2 meters of the goal location), the target may move out of the image sensors' field of view, so the robot 100 uses wheel odometry, visual odometry, or lidar to track its motions toward the goal location (step 914). The goal location may be such that the edge of the conveyor belt 600 is about 1 cm to about 5 cm the edge of the stationary conveyor belt 810 or other edge, surface, or space for loading or unloading items.

The cart's on-board processors orient the cart so that the conveyor belt is positioned for unloading (step 916). If the conveyor belt 600 turns in only one direction (e.g., the direction of motion indicated by the arrow in FIG. 8B), the on-board processors keep track of the robot's 'load' and 'unload' orientations as they plan and navigate to a target load or unload destination. For unloading, the robot orients itself so that the conveyor belt moves towards the loading station. And for loading (FIG. 9B), the robot orients itself so that the conveyor belt moves away from the loading station. However, the conveyor can be configured to move in both directions. If it moves in both directions, the on-board processors keep track of the correct robot orientation with respect to the conveyor direction for either loading or unloading as well as the direction the conveyor belt turns. Whether the conveyor belt 600 moves in one direction or two direction, the cart is usually oriented so that the conveyor belt's direction of motion that forms an angle of 10° or less (e.g., 7.5°, 5°, 2.5°, 1.25°, or less) with the direction of motion of the stationary conveyor belt 810.

If appropriate, the conveyor belt's height/tilt actuator 630 may move the conveyer belt up or down and/or tilt the conveyor belt (step 918) so that the conveyor belt lines up with the loading station. The cart's on-board processors may estimate the height of a stationary conveyor belt at the loading station using visual cues or a priori knowledge of the height of a stationary conveyor belt. If the stationary conveyor belt 800 is higher or lower than the conveyor belt 600 on the cart 100, the height/tilt actuator 630 adjusts the conveyor belt 600 so that packages can be transferred smoothly between the stationary conveyor belt 800 and the conveyor belt 600 on the cart 100.

Once the processors detect that the cart 100 and the conveyor belt 600 are positioned properly (e.g., within 1-5 cm of the stationary conveyor belt 800) relative to the target (step 920) from the imagery, odometry measurement(s), and/or lidar measurements, they trigger the conveyor belt 600 to unload. Unloading can happen onto a table (typically sloping downward such that the contents slide away from the robot as it unloads), another conveyor (e.g., a gravity-feed or powered conveyor belt, such as the auto-load conveyor table described above), into a static bin or box, or into or onto another vehicle.

The conveyor belt unloads items by running at a predetermined speed for a predetermined time (step 922). This speed and time are selected based on the conveyor belt's length, safety considerations, and the desire to avoid damaging the items being unloaded. A 1.5-meter-long conveyor belt may run at 1 meter/second for 2 seconds to ensure that everything on the conveyor belt is transferred to the loading station. The speed and time may be adjusted for other conveyor belt lengths, etc. The conveyor belt stops at the end of this transfer period (step 924).

If desired, the cart may use its load cells to check for any items that are partially on the conveyor belt after the conveyor belt has been stopped. If the cart senses a mass on the conveyor belt after the conveyor belt has been stopped (step 932), it may determine that an item has been partially unloaded instead of fully unloaded based on the mass and the spatial distribution of the mass (step 934). In these cases, the cart may issue an alert that prompts user intervention (step 936). The alert can be a flashing line, audible cue, text message, email, message on a website, etc. If the load cells don't sense any extra mass, then unloading is complete (938), and the cart can proceed to its next destination.

The loading process 901 shown in FIG. 9B shares several steps with the unloading in process 900 in FIG. 9A. To start, the cart's vision system collects imagery of the loading station (step 904) and identifies the loading station in the imagery (step 906). It may also determine if a package is waiting for the cart at the loading station (step 908*b*). The cart's onboard processors plan a path to the loading station based on the imagery (step 910), and the cart moves next to the loading station (step 912). While the cart moves toward the loading station, the cart's vision system makes a visual odometry measurement, the cart's encoders make wheel odometry measurements, and/or the cart's lidar makes measurements (step 914) for determining that the cart is aligned with and close enough to the loading station.

The cart also orients itself with respect to the loading station based on the conveyor belt's direction of motion (step 916). If appropriate, the height/tilt actuator moves the conveyor belt edge up or down to be at or near the same height as the edge of the loading station (step 918). Based on the visual odometry, wheel odometry, and/or lidar measurements, the cart determines that the edge of the conveyor belt is within 1-5 cm of and forms an angle of 10° or less with the edge of the loading station (step 920).

In response to determining that the cart is positioned properly, the cart's processor triggers both the cart's conveyor belt and a stationary conveyor belt at the loading station (step 942). It may do this by transmitting a wireless signal (e.g., a Wi-Fi or Bluetooth signal) to communication module coupled to the stationary conveyor belt. Alternatively, the cart may actuate its conveyor belt in response to a wireless signal from the loading station, server, or other device. The conveyor belts may also be actuated by a proximity sensor or by a server that communicates with both the cart and the loading station. The cart's conveyor belt runs until it is loaded, e.g., as indicated by a signal from a light fence (step 944) or another external control signal. The cart's conveyor belt stops in response to this signal (step 946).

At this point, the cart's load cells can sense the mass on the conveyor belt (step 932). Depending on the measured mass (v. the expected mass) and the distribution of the measured mass, the cart's processors may determine that an item has been partially loaded instead of fully loaded (step 934). In these cases, the cart may issue an alert, such as a flashing light, sound, or electronic message, that prompts user intervention (step 936). If the load cells sense that the expected mass, then loading is complete (938), and the cart can proceed to its next destination.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," about a list of one or more elements, should be understood to mean at least one element selected from any one or more of the elements in the list of elements, but not necessarily including at least one of each element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method comprising:
   detecting, by an autonomous cart, an unloading station;
   moving, by the autonomous cart, to a position at or near the unloading station;
   determining, using a first load cell, a first position of a first item on a conveyor belt of the autonomous cart;
   determining a length of time for which to actuate the conveyor belt based at least in part on the first position; and
   causing the conveyor belt to unload the first item from the autonomous cart by actuating the conveyor belt for the length of time.

2. The method of claim 1, further comprising:
   determining, using a second load cell, a second position of a second item on the conveyor belt;
   determining that the second item is to remain on the conveyor belt after the first item is unloaded; and
   determining, using a third load cell, that the second item is on the conveyor belt after the first item is unloaded.

3. The method of claim 1, further comprising:
   determining that the first item is partially unloaded;
   generating an alert indicating that the item is partially unloaded; and
   actuating the conveyor belt for an additional length of time.

4. The method of claim 1, further comprising:
   determining a first height of the unloading station; and
   adjusting a second height of the conveyor belt based at least in part on the first height.

5. The method of claim 1, further comprising:
   determining a spatial distribution of the first item and a second item on the conveyor belt; and
   determining an orientation of the autonomous cart with respect to the unloading station based at least in part on the spatial distribution.

6. The method of claim 1, wherein moving to the position at or near the unloading station comprises moving to the position at or near the unloading station based at least in part on an onboard map of an environment.

7. The method of claim 1, further comprising:
   determining, using a second load cell, that the first item is unloaded from the autonomous cart.

8. An autonomous robot comprising:
   a camera;
   a motor;
   a conveyor belt;
   memory comprising computer-executable instructions; and
   at least one processor coupled to the memory and configured to execute the computer-executable instructions to:
   detect a loading or unloading station using the camera;
   cause the autonomous robot to move to a position at or near the unloading station;
   determine a spatial distribution of a first item and a second item on the conveyor belt; and determine an orientation of the autonomous robot with respect to the loading or unloading station based at least in part on the spatial distribution.

9. The autonomous robot of claim 8, wherein the at least one processor is further configured to execute the computer-executable instructions to:
determine a length of time for which to actuate the conveyor belt based at least in part on a position of the first item on the conveyor belt; and
cause the conveyor belt to unload the first item from the conveyor belt by actuating the conveyor belt for the length of time.

10. The autonomous robot of claim 8, wherein the at least one processor is further configured to execute the computer-executable instructions to:
determine a first height of the loading or unloading station; and
adjust a second height of the conveyor belt based at least in part on the first height.

11. The autonomous robot of claim 8, further comprising:
a first load cell; and
a second load cell;
wherein the at least one processor is further configured to execute the computer-executable instructions to:
determine, using the first load cell, a first position of the first item on the conveyor belt; and
determine, using the second load cell, a second position of the second item on the conveyor belt.

12. The autonomous robot of claim 11, wherein the at least one processor is further configured to execute the computer-executable instructions to:
determine that the first item is to be unloaded;
determine, using the first load cell, that the first item is partially unloaded; and
generate a user alert indicating that the first item is partially unloaded.

13. The autonomous robot of claim 8, wherein the at least one processor is further configured to execute the computer-executable instructions to:
determine an orientation for the autonomous robot based at least in part on a direction of movement of the conveyor belt.

14. The autonomous robot of claim 8, wherein the at least one processor is further configured to execute the computer-executable instructions to:
determine a route to move to the position at or near the unloading station based at least in part on an onboard map of an environment.

15. A method comprising:
detecting, by an autonomous cart, a loading or unloading station;
moving, by the autonomous cart, to a position at or near the loading or unloading station;
triggering loading of a first item onto a conveyor belt of the autonomous cart;
actuating the conveyor belt;
determining, using a first load cell, that the first item is being loaded;
determining, using the first load cell, that the first item is loaded onto the conveyor belt; and
ceasing actuation of the conveyor belt after determining that the first item is loaded onto the conveyor belt.

16. The method of claim 15, further comprising:
determining, using a second load cell, a position of the first item on the conveyor belt prior to ceasing actuation of the conveyor belt.

17. The method of claim 15, further comprising:
determining, using the first load cell, that a second item is being loaded onto the conveyor belt; and
determining, using the first load cell, that the second item is loaded onto the conveyor belt.

18. The method of claim 15, further comprising:
determining that the first item is partially unloaded from the conveyor belt;
generating an alert indicating that the item is partially unloaded; and
actuating the conveyor belt until the item is fully unloaded from the conveyor belt.

19. The method of claim 15, further comprising:
determining a first height of the loading or unloading station; and
adjusting a second height of the conveyor belt based at least in part on the first height.

20. The method of claim 15, further comprising:
determining a spatial distribution of the first item and a second item on the conveyor belt; and
determining an orientation of the autonomous cart with respect to the loading or unloading station based at least in part on the spatial distribution.

21. The method of claim 15, further comprising:
determining a route to move to the position at or near the loading or unloading station based at least in part on an onboard map of an environment.

* * * * *

UNITED STATES PATENT AND TRADEMARK OFFICE
CERTIFICATE OF CORRECTION

PATENT NO. : 11,643,279 B1
APPLICATION NO. : 17/021449
DATED : May 9, 2023
INVENTOR(S) : Danny Sekich et al.

It is certified that error appears in the above-identified patent and that said Letters Patent is hereby corrected as shown below:

On the Title Page

"(73) Assignee: Amazon Technologies,Inc., Seattie, WA(US)" should read --(73) Assignee: A9.com, INC., Palo Alto, CA(US)--.

Signed and Sealed this
Thirteenth Day of June, 2023

Katherine Kelly Vidal
*Director of the United States Patent and Trademark Office*